US006869586B1

(12) United States Patent
Moser et al.

(10) Patent No.: US 6,869,586 B1
(45) Date of Patent: Mar. 22, 2005

(54) METHOD OF PREPARING METAL CONTAINING COMPOUNDS USING HYDRODYNAMIC CAVITATION

(75) Inventors: William R. Moser, Hopkinton, MA (US); Oleg V. Kozyuk, Westlake, OH (US); Josef Find, Worcester, MA (US); Sean Christian Emerson, Worcester, MA (US); Ivo M. Krausz, Worcester, MA (US)

(73) Assignees: Five Star Technologies, Inc., Cleveland, OH (US); Worcester Polytechnic Institute, Worcester, MA (US)

(*) Notice: Subject to any disclaimer, the term of this patent is extended or adjusted under 35 U.S.C. 154(b) by 0 days.

(21) Appl. No.: 10/615,309

(22) Filed: Jul. 8, 2003

Related U.S. Application Data (63) Continuation of application No. 10/047,452, filed on Jan. 15, 2002, now Pat. No. 6,589,501, which is a continuation of application No. 09/426,254, filed on Oct. 25, 1999, now Pat. No. 6,365,555.

(51) Int. Cl.[7] ................. C01G 23/047; C01G 25/02; C01G 9/02; C01G 5/04; C01G 39/02
(52) U.S. Cl. ........................................ 423/659
(58) Field of Search ................. 423/592, 593, 423/594, 595, 598, 604, 606, 607, 610, 611, 622, 632, 636, 639, 659; 502/313, 321; 505/441

(56) References Cited

U.S. PATENT DOCUMENTS

| 2,790,838 A | 4/1957 | Schrader |
| 3,408,417 A | 10/1968 | Sogawa et al. |
| 3,834,982 A | 9/1974 | Alexandrovich et al. |
| 3,937,445 A | 2/1976 | Agosta |
| 3,988,329 A | 10/1976 | Zucker |
| 4,127,332 A | 11/1978 | Thiruvengadam et al. |
| 5,300,216 A | 4/1994 | Hertzberg et al. |
| 5,413,145 A | 5/1995 | Rhyne et al. |
| 5,417,956 A | 5/1995 | Moser |
| 5,466,646 A | 11/1995 | Moser |
| 5,492,654 A | 2/1996 | Kozjuk et al. |
| 5,810,052 A | 9/1998 | Kozyuk |
| 5,931,771 A | 8/1999 | Kozyuk |
| 5,937,906 A | 8/1999 | Kozyuk |
| 5,969,207 A | 10/1999 | Kozyuk |
| 6,365,555 B1 * | 4/2002 | Moser et al. ............... 423/595 |
| 6,589,501 B2 * | 7/2003 | Moser et al. ............... 423/595 |

FOREIGN PATENT DOCUMENTS

| EP | 90403456.8 | 12/1990 |
| EP | 93206355.8 | 7/1992 |
| GB | 983962 | 10/1961 |

OTHER PUBLICATIONS

"Magnum Water Technology" by Western Magnum Corporation, Aug. 12, 1997.
"Use of Hydrodynamic Cavitation for Emulsifying and Homogenizing Processes", Kozyuk, Oleg, American Laboratory News, Jun. 1999.

* cited by examiner

Primary Examiner—Wayne A. Langel
(74) Attorney, Agent, or Firm—Benesch, Friedlander, Coplan & Aronoff LLP (57) ABSTRACT

A process for the preparation of nanostructured materials in high phase purities using cavitation is disclosed. The method comprises mixing a metal containing solution with a precipitating agent and passing the mixture into a cavitation chamber. The chamber consists of a first element to produce cavitation bubbles, and a second element that creates a pressure zone sufficient to collapse the bubbles. The process is useful for the preparation of mixed metal oxide catalysts and materials for piezoelectrics and superconductors.

23 Claims, 2 Drawing Sheets

METHOD OF PREPARING METAL CONTAINING COMPOUNDS USING HYDRODYNAMIC CAVITATION

CROSS-REFERENCE TO RELATED APPLICATIONS

This application is a continuation of U.S. application Ser. No. 10/047,452 filed on Jan. 15, 2002, now U.S. Pat. No. 6,589,501, which is a continuation of U.S. application Ser. No. 09/426,254 filed on Oct. 25, 1999, now U.S. Pat. No. 6,365,555.

BACKGROUND OF THE INVENTION

Cavitation is the formation of bubbles and cavities within a liquid stream resulting from a localized pressure drop in the liquid flow. If the pressure at some point decreases to a magnitude under which the liquid reaches the boiling point for this fluid, then a great number of vapor-filled cavities and bubbles are formed. As the pressure of the liquid then increases vapor condensation takes place in the cavities and bubbles, and they collapse, creating very large pressure impulses and very high temperatures. According to some estimations, the temperature within the bubbles attains a magnitude on the order of 5000° C. and a pressure of approximately 500 kg/cm$^2$ (KS Suslick, Science, Vol. 247, 23 March 1990, pgs. 1439–1445). Cavitation involves the entire sequence of events beginning with bubble formation through the collapse of the bubble. Because of this high energy level, cavitation has been studied for its ability to mix materials and aid in chemical reactions.

There are several different ways to produce cavitation in a fluid. The way known to most people is the cavitation resulting from a propeller blade moving at a critical speed through water. If a sufficient pressure drop occurs at tile blade surface, cavitation will result. Likewise, the movement of a fluid through a restriction such as an orifice plate can also generate cavitation if the pressure drop across the orifice is sufficient. Both of these methods are commonly referred to as hydrodynamic cavitation. Cavitation may also be generated in a fluid by the use of ultrasound. A sound wave consists of compression and decompression cycles. If the pressure during the decompression cycle is low enough, bubbles may be formed. These bubbles will grow during the decompression cycle and contract or even implode during, the compression cycle. The use of ultrasound to generate cavitation to enhance chemical reactions is known as Sonochemistry.

Both of these methods of cavitation to enhance mixing or aid in chemical reactions have had mixed results, mainly due to the inability to adequately control cavitation. U.S. Pat. Nos. 5,810,052, 5,931,771 and 5,937,906 to Kozyuk disclose an improved device capable of controlling the many variables associated with cavitation and the use of such a device in Sonocemical type reactions.

Metal-based materials have many industrial uses. Of relevance to the present invention are those solid state metal-based materials such as catalysts, piezoelectric materials, superconductors, electrolytes, ceramic-based products, and oxides for uses such as recording media. While these materials have been produced through normal co-precipitation means, U.S. Pat. Nos. 5,466,646 and 5,417,956 to Moser disclose the use of High shear followed by cavitation to produce metal based materials of high purity and improved nanosize. While the results disclosed in these patents are improved over the past methods of preparation, the inability to control the cavitation effects limit the results obtained.

SUMMARY OF THE INVENTION

Accordingly, the present invention is directed to a process for producing metal based solid state materials of nanostructured size and in high phase purities utilizing controlled cavitation to both create high shear and to take advantage of the energy released during bubble collapse.

The process generally comprises the steps of:

(a) mixing a metal containing solution with a precipitating agent to form a mixed solution that precipitates a product;

(b) passing said mix ed solution at elevated pressure and at a velocity into a cavitation chamber, wherein said cavitation chamber has means for creating a cavitation zone and means for controlling said zone, and wherein cavitation of the mixed solution take place, forming a cavitated precipitated product;

(c) removing said cavitated precipitated product and said mixed solution from said cavitation chamber; and (d) Separating said cavitated precipitated product from said mixed solution.

The process according to the present invention preferably employs a special apparatus to carry out step (b) in the process. Such a suitable apparatus may be found in U.S. Pat. No. 5,937,906 to Kozyuk, which disclosure is incorporated by reference herein.

The present invention is particularly suitable for producing nanophase solid state materials such as metal oxides and metals supported on metal oxides. The synthesis of nanostructured materials in high phase purities is important for obtaining pure metal oxides and metals supported on metal oxides for applications in catalytic processing and electronic and structural ceramics. The synthesis of such materials by hydrodynamic cavitation results in both nanostructured materials as well as high phase purity materials due to the fact that such processing results in high shear and high temperature local heating, applied to the synthesis stream components. High shear causes the multi—metallics to be well mixed leading to the high phase purities and nanostructured particles, and the high in situ temperatures results in decomposition of metal salts to the finished metal oxides or metals supported on metal oxides. The present invention may decompose at least some of the metal salts, and preferably all of the metal salts.

The advantage of the latter aspect is that materials produced by controlled cavitation do not require post synthesis thermal calcination to obtain the finished metal oxides while conventional methods of synthesis requires a high temperature calcination step to decompose the intermediate metal salts such as carbonates, hydroxides, chlorides etc. Such steps are often exothermic and hazardous to accomplish on an industrial scale.

The ability to synthesize advanced materials by hydrodynamic cavitation requires that the equipment used to generate cavitation have the capability to vary the type of cavitation that is instantaneously being applied to the synthesis process stream. The subject invention utilizes controlled cavitation to efficiently alter the cavitational conditions to meet the specifications of the desired material to be synthesized. The importance of the method is a capability to vary the bubble size and length of the cavitational zone, which results in a bubble collapse necessary to produce nanostructured pure phase materials. The correct type of bubble collapse provides a local shock wave and energy release to the local environment by the walls of the collapsing bubbles which provides the shear and local heating required for synthesizing pure nanostructured materials. The cavitation method enables the precise adjustment of the type of cavitation for synthesizing both pure metal oxide materials as well as metals supported on metal oxides, and slurries of pure reduced metals and metal alloys. A further capability of the method, which is important to the synthesis of materials for both catalysts and advanced materials for electronics and ceramics, is the ability to systematically vary the grain sizes by a simple alteration of the process conditions leading to cavitation. The importance of this aspect of the technology is the well known phenomena that many catalytic processes show reaction rates which are greatly accelerated by catalysts having grain sizes in the 1–10 run range. Furthermore, materials used in ceramic as well as structural ceramics applications have been observed to density at higher rates and to higher densities when the starting materials can be synthesized in the optimum fine grain size.

The importance of the said described invention is that it is a general method of synthesis of nanostructured materials in high phase purities while all known conventional methods of synthesis results in lower quality materials. The said invention has the capability to synthesize single metal oxides in varying grain sizes of 1–20 nm, multimetallic metal oxides in varying grain sizes and as single phase materials without the presence of any of the individual metal oxide components of the desired pure materials situated on the surface of the desired pure material. Furthermore, the synthesis of reduced metals supported on metal oxides in both grain sizes of 1–20 nm and the capability to vary the grain sizes between 1–20 nm is also possible. Due to these unique capabilities, as compared to conventional methods of synthesis, the said method affords high quality catalysts, capacitors, piezoelectrics, novel titanias, electrical and oxygen conducting metal oxides, fine grains of slurries of finely divided reduced metals, and superconductors. Conventional methods of synthesis have demonstrated the capabilities to synthesize some of these materials in high purity and fine grains; however, these processes have required a substantial adjustment in the chemistry of the synthesis of such materials. The problem with the conventional approach to the synthesis of high quality solid state materials is that the theory controlling precipitation and the chemistry of synthesis is not well understood or controllable.

DESCRIPTION OF THE PREFERRED EMBODIMENTS

The apparatus utilized in the present invention consists of a pump to elevate the pressure of the liquid being fed to the apparatus, and a cavitation zone within the Apparatus. The cavitation zone comprises:

(a) A flow-through channel having a flow area, internally containing at least one first element that produces a local constriction of the flow area, and having an outlet downstream of the local constriction; and (b) A second element that produces a second local constriction positioned at the outlet, wherein a cavitation zone is formed immediately after the first element, and an elevated pressure zone is created between the cavitation zone and the second local constriction.

The liquid is first pressurized, and then enters the flow-through channel. A local constriction in the channel creates an increase in the velocity of the liquid flow to some minimum velocity, creating a sufficient pressure drop to allow cavitation to occur. On average, and for most hydrodynamic liquids, the minimum velocity is 16 m/sec or greater.

The first element producing the local constriction may take many different shapes. It may be of the form of a cone, or spherical or elliptical shape, and can be located in the center of the flow channel. It is possible to use a crosshead, post, propeller, nozzle or any other fixture that produces a minor loss in pressure. Preferred is one or more orifices or baffles. By varying the size of the orifice, the apparatus is able to better control the size of the cavitation bubbles being formed. The orifice may have one or more circular or slotted openings.

The cavitation bubbles then are transported by the flow of liquid immediately into a cavitation zone, which comprises numerous cavitation bubbles. The cavitation bubbles then flow with the liquid into an elevated pressure zone. By having a second element in the flow channel downstream of the cavitation zone, a back pressure is created to form the elevated pressure zone. The second element can also take many shapes, but an element similar in operation to a control valve is preferred. By controlling the pressure in this zone, the apparatus is able to determine the length of the cavitation zone and determine when bubble collapse will occur. Upon entering the elevated pressure zone, the cavitation bubbles collapse, resulting in high pressure implosions with the formation of shock waves that emanate from the point of each collapsed bubble. Under the high temperatures and pressures caused by bubble collapse, the liquid on the boundary of the bubble, and the gas within the bubble itself, undergo chemical reactions depending upon the materials in the feed. These reactions may be oxidation, disintegration or synthesis, to name a few.

In another aspect of the invention, the second element can be the first element of a second cavitation zone. In this manner two or more cavitation zones may be placed in series to produce a multi-stage apparatus. Each cavitation zone is controllable depending on the first element selected for the next cavitation zone, the distance between each first and second element, and by the final second element at the end of the multi-stage apparatus.

In yet another aspect of the invention, the second element can be as simple as a extended length of the channel, a turn or elbow in the channel, or another piece of processing equipment. The second element must provide some back pressure to create the cavitation and elevated pressure zones.

The desired cavitated products are then removed from the liquid by suitable separation techniques, such as vacuum filtration, filtration and evaporation. Prior to or after removal of the cavitated products, the liquid may be recycled back to the cavitation chamber. Recycle of the unfiltered product may occur many times. Where multi-stage cavitation chambers are used, recycle may be to one or more of the chambers. As the length of the period of recirculation increases, the resulting final product generally has a higher degree of phase purity and smaller particle size.

The nanostructured materials of the present invention are typically prepared by precipitation of the desired product from a metal containing solution. The metal containing solution normally is aqueous, but can be non-aqueous. At least one component of the metal containing solution must be in a liquid state and be capable of creating cavitation. Other components may be different liquids, solids, gasps, or mixtures thereof. The liquid component could be materials commonly thought of as liquid, or can be materials com monly thought of as solid or gas being processed in their liquid state. Examples of such materials are molten metals and molten minerals, as long as the vapor pressure is sufficiently low enough to generate bubbles, and liquid carbon dioxide.

Most metals are in the form of salts. However, in the case of certain precious metals the metal may be added in the form of an acid such as chlorplatinic acid. Examples of suitable salts include nitrates, sulfates, acetates, chlorides, bromides, hydroxide, oxylates and acetylacetonates. The metal may be cobalt, molybdenum, bismuth, lanthanum, iron, strontium, titanium, silver, gold, lead, platinum, palladium, yttrium, zirconium, calcium, barium, potassium chronmium, magnesium, copper, zinc, and mixtures thereof, although any other metal may find use in the present invention. For example, iron oxide may be made from ferric nitrate hydrate, barium titanate from a mixture of barium acetate in water and titanium tetraisopropoxide in isopropyl alcohol, and a ceramic such as lanthana from lanthanum nitrate. Complex metal catalysts such as iron bismuth molybate may be formed utilizing the appropriate metal salts.

A class of metals typically suited for piezoelectric, materials are lanthanum, titanium, gold, lead, platinum, palladium yttrium, zirconium, zinc and mixtures thereof A class of metal typically suited for superconductors are strontium lead, yttrium, copper, calcium, barium and mixtures thereof.

The solution into which the salt is dissolved will depend upon the particular metal salt. Suitable liquids include water, aqueous nitric acid, alcohols, acetone, hydrocarbons and the like.

The precipitating agent may be selected from any suitable basic material such as sodium carbonate, ammonium carbonate, potassium carbonate, ammonium hydroxide, alkali metal hydroxide or even water where the metal salt reacts with water. Any liquid which causes the desired metal salt to precipitate from solution due to insolubility of the metal salt in the liquid may be a precipitating agent.

In the embodiments where recycling occurs, it is desirable that the pH of the mixed solution be maintained on the basic side, usually between 7.5–12. However, the range is dependent on the precise material being synthesized.

In the case of preparing catalysts, a support may be added directly to the metal containing solution, the precipitating agent or both. Suitable supports include alumina, silica, titania, zirconia and alumino-silicates. The support may also be added in the form of a salt, such as alumina being added as aluminum nitrate hydrate where the support itself is precipitated in the form of nanostructured grains imder cavitational conditions.

Zeolites such as ZSM-5, X-Type, Y-Type, and L-Type may be prepared using the process of the present invention. Metal loaded zeolitic catalyst; typically contain a metal component such as platinum, palladium, zinc, gallium, copper or iron. The metal salt solution, the precipitating agent and a silica source may be premixed to form a zeolite gel prior to passing to the cavitation chamber. Where the gel requires heat to form, the mixture may be recycled in the cavitation chamber until the gel forms and the synthesis results. Alternately, after cavitation, the well dispersed gel may be placed in a conventional autoclave where a hydrothermal synthesis is carried out. This method will result in much finer grain zeolites after the conventional hydrothermal treatment.

The process of the present invention has applicability to catalysts, electrolytes, piezo-electrics, super-conductors and zeolites as examples of nanostructured materials.

The following examples show the benefit of the present process in the production of nanosize high purity products.

Two apparatuses were used in these examples. The Model CaviPro™ 300 is a two stage orifice system operating up to 26,000 psi with a nominal flow rate of 300 m/min and up. The CaviMax™ CFC-2h is a single orifice system operating up to 1000 psi with a nominal flow rate of several liters per minute. Both of these devices are obtainable from Five Star Technologies Ltd, Cleveland, Ohio. Modifications were made to the peripheral elements of these devices, such as heat exchangers, cooling jacket, gauges and wetted materials, depending on the application contained in the examples.

EXAMPLE 1

This example illustrates that controlled cavitation enables the synthesis of an important hydrodesulfurization catalyst for use in the environmental clean-up of gasoline in a substantially improved phase purity as compared to conventional preparations. The preparation of cobalt molybdate with a Mo/Co ratio of 2.42 was carried out in the CaviPro™ processor. Different orifice sizes were used for the experiment at a hydrodynamic pressure of 8,500 psi. In each experiment 600 ml of 0.08M of ammonium hydroxide in isopropanol was placed in the reservoir and recirculated. While this precipitating agent was recirculated, a mixture of 3.43 g (0.012 mol) of $CoNO_3 6H_2O$ and 5.05 g (0.029 mol) $(NH_4)_6Mo_7O_{24}.4H_2O$ dissolved in 50 ml of distilled water was metered in over 20 minutes. After the salt solution had been added, the resulting slurry was immediately filtered under pressure and dried for 10 hours at 110° C. XRD analyses were recorded after air calcination at 325° C.

The conventional preparation of cobalt molybdate with a Mo/Co ratio of 2.42 was carried out in classical synthesis. In each experiment 600 ml of 0.08 M of ammonium hydroxide in isopropanol was placed in a well stirred vessel. While this precipitating agent was stirred, a mixture of 3.43 g (0.012 mol) of $CoNO_3.6H_2O$ and 5.05 g (0.029 mol) $(NH_4)_6Mo_7O_{24}.4H_2O$ dissolved in 50 ml of distilled water was metered in over 20 minutes. After the salt solution had been added, the resulting slurry was immediately filtered under pressure and dried for 10 hours at 110° C. XRD analyses were recorded after air calcination at 325° C.

The XRD pattern of the material after calcining in air indicates, by the high intensity of the reflection at 26.6 degrees 2θ in all of the syntheses using cavitational processing, the formation of a high fraction of cobalt molybdate. Furthermore, the XRD of the conventional method demonstrated a much lower intensity peak at 26.6 degrees 2θ as well as strong reflections at 23.40 and 25.75 degrees 2θ due to separate phase $MoO_3$. Thus the present process produced a higher purity catalyst than found in the prior art.

EXAMPLE 2

The catalyst of Example 1 was repeated but at a higher hydrodynamic pressure of 20,000 psi. XRD patterns showed even higher phase purity as compared to the cavitation preparation in Example 1 and much better purity as compared to the classical synthesis.

EXAMPLE 3

The catalyst of Example 1 was prepared using a CaviMax processor at a lower pressure. The orifice used was 0.073 inches diameter at 580 psi head pressure. The back pressure was varied between 0–250 psig. The phase purity of cobalt molybdate was nearly as high as that observed in Example 2 and much better than that observed in Example 1. It was much better than the conventional preparation that did not use hydrodynamic cavitation. The XRD data shows that the application of all back pressures resulted in higher purity phase of cobalt molybdate as compared to the conventional preparation.

EXAMPLE 4

Example 1 was repeated using a CaviMax™ processor at a pressure of 200–660 psi. and using orifice sizes of 0.073, 0.075, 0.089, and 0.095 inches diameter. The phase purities of the catalysts were all improved. The use of an orifice diameter of 0.095 inches at 280 psi resulted in a superior quality hydrodesulfurization catalyst as compared to all of the other diameters as well as the conventional synthesis.

EXAMPLE 5

This example illustrates the capability of the present invention to synthesize high phase purities of cobalt molybdate supported on gamma-alumina. The synthesis of this material was carried out as follows:

The preparation of cobalt molybdate deposited on gamma-alumina with a Mo/Co ratio of 2.42 was carried out in the Cavipro™ processor. A cavitation generator having 0.009/0.010 inch diameter orifice sizes was used for the experiment at a hydrodynamic pressure range of 4,000, 7,000, and 8,000 psig. In each experiment 600 ml of a solution of 0.0102% ammonium hydroxide in isopropyl alcohol (EPA) was placed in the reservoir along with 5.0 g of gamma-alumina, and the slurry was recirculated through the processor. While this precipitating agent was recirculated, 0.859 g (0.00295 mol) of $Co(NO_3)_3 \cdot 6H_2O$ and 1.262 g (0.000715 mole) of $(NH_4)_6Mo_7O_{24} \cdot 4H_2O$ dissolved in 50 ml of water was metered in over 20 minutes. After all of the salt solutions had been added, the resulting slurry was recirculated through the processor for an additional 5 minutes. The slurry was immediately filtered under pressure and dried for 10 hours at 110° C. XRD analyses were recorded after air calcination at 350° C. for four hours.

At all pressures the experiment resulted in superior phase purities of the active hydrodesulfurization catalyst precursor, cobalt molybdate, as compared to the conventional synthesis of the same catalyst. In addition, for this catalyst, the optimum conditions for the generation of the smallest nanostructured grains of the catalyst resulted from the low pressure, 4,000 psi synthesis.

EXAMPLE 6

The catalyst of Example 5 was prepared using silica in place of alumina. The synthesis of this material was carried out as follows:

The preparation of cobalt molybdate deposited on Cabosil (silica) with a Mo/Co ratio of 2.42 was carried out in the CaviPro processor. Different orifice sizes were used for the experiment at a hydrodynamic pressure range of 10,000 psi. In each experiment 600 ml of 0.0102% ammonium hydroxide in isopropyl alcohol (IPA) was placed in the reservoir along with 5.0 g of Cabosil, and the slurry was recirculated through the processor. While this precipitating agent was recirculated, 0.859 g (0.00295 mol) of $Co(NO_3)_3 \cdot 6H_2O$ and 1.262 g (0.000715 mol) of $(NH_4)_6Mo_7O_{24} \cdot 4H_2O$ dissolved in 50 ml of water was metered in over 20 minutes. After all of the salt solutions had been added, the resulting slurry was recirculated through the processor for an additional 5 minutes. The slurry was immediately filtered under pressure and dried for 10 hours at 110° C. XRD analyses were recorded after air calcination at 350° C. for four hours.

The cavitational synthesis resulted in higher phase purity for cobalt molybdate deposited on silica as compared to the conventionally prepared catalyst, and the use of a 0.006 and 0.014 inch diameter orifice set led to finer nanostructured grains of the catalyst.

EXAMPLE 7

The present invention was used to synthesize beta-bismuth molybdate ($Bi_2Mo_2O_9$), which is typical of the family of catalysts used for hydrocarbon partial oxidations such as the conversion of propylene to acrolein or ammoxidation of propylene to acrylonitrile. This synthesis used a CaviMax™ processor with four different orifice sizes in a low pressure mode. The synthesis of this material was carried out as follows.

450 ml of IPA was used as the precipitating agent, and was placed in the reservoir. While this precipitating agent was recirculated, 12.83 g, 0.0264 mol of $Bi(NO_3)_3 \cdot 5H_2O$ dissolved in 50 ml of 10% $HNO_3$, and 4.671 g, 0.00378 mol $(NH_4)_6Mo_7O_{24} \cdot 4H_2O$ dissolved in 50 ml of distilled water was metered in over 20 minutes. After all of the salt solutions had been added, the resulting slurry was recirculated through the processor for an additional 2 minutes. The slurry was immediately filtered under pressure and dried for 10 hours at 110° C. XRD analyses were recorded after air calcination at 350° C.

TABLE 1

| Variation of Grain Sizes | |
|---|---|
| Orifice Diameter (in.) | Crystallite Grain Size (nm) |
| 0.073 | 21 |
| 0.081 | 28 |
| 0.089 | 22 |
| 0.095 | 11 |

The cavitational syntheses all resulted in pure phase beta-bismuth molybdate. Furthermore, the XRD patterns showed that the grain size of the particles could be varied over a wide range of manometer sizes by changing the orifice sizes. Since it is well known in the catalytic literature that manometer gains of catalysts often result in greatly accelerated reaction rates, the capability of the cavitational syntheses to vary this grain size is of general importance to several catalytic reactions other than hydrocarbon partial oxidation.

EXAMPLE 8

This example shows that the present invention as applied to the synthesis of complex metal oxides such as perovskites and $ABO_3$ metal oxides results in unusually high phase purities not attainable by conventional methods of synthesis. The synthesis of this material was carried out as follows:

The synthesis of $La_7Sr_3FeO_3$ was performed using a CaviMax™ processor and using orifice sizes of 0.073, 0.081, 0.089, and 0.095 inch diameter. 600 ml of a 1M solution of $Na_2CO_3$ in distilled water was placed in the reservoir, and the slurry was recirculated through the processor. While this precipitating agent was recirculated, $La(NO_3)_3 \cdot 6H_2O$ (7.999 g, 0.0185 mol), $Fe(NO_3)_3 \cdot 9H_2O$ (10.662 g, 0.0264 mol) and $Sr(NO_3)_2$ (1.6755 g, 0.00792 mol) were dissolved in 100 ml of distilled water and this solution was metered in over 20 minutes. After all of the salt solutions had been added, the resulting slurry was recirculated through the processor for an additional 5 minutes. The slurry was immediately filtered under pressure and dried for 10 hours at 110° C. XRD analyses were recorded after air calcination at 600° C.

The XRD data showed that an orifice size of 0.095 inches diameter resulted in the synthesis of nanostructured pure phase perovskite, $La_{0.8}Sr_{0.2}Fe_{1.0}O_{3.0-x}$, as a nanostructured material of 18 nm and the phase purity was much better than that attainable by the conventional synthesis.

Parallel experiments using the CaviPro™ processor using orifice sets of 0.006/0.008, 0.006/0.010, 0.006/0.012 and 0.006/0.014 inch diameter all resulted in completely pure phases of the desired perovskite containing no separate phase impurities. These results were superior to both the CaviMax™ and conventional synthesis. The importance of this type of perovskite material is for CO oxidation in automotive exhaust emissions applications, for solid state oxygen conductors for fuel cells applications, and for dense catalytic inorganic membranes used for oxygen transportation in the reforming of methane to syngas.

EXAMPLE 9

This example shows that strain can be systematically introduced into a solid state crystallite by use of the present invention. The example examined the synthesis of titanium dioxide using the CaviMax™ processor and examined the effect of strain introduced into the $TiO_2$ crystal as the orifice size of the cavitation processor was systematically changed. The synthesis of this material was carried out as follows:

100 g (0.27664 mol) Ti-Butoxide was mixed with 2-Propanol to give a volume of 0.51 (Molarity=0.553 mol) in a glove-box under nitrogen. This process yielded a clear yellowish solution, which is stable in air. 750 ml of deionized water was placed for a typical run in the reservoir of the CaviMax and circulated. 75 ml of the Ti-Butoxide/2-Propanol solution was added slowly with a feed rate of 4 ml/minute. The solution with the precipitated Ti-compound was circulated for an additional 17 minutes. Afterwards the slurry was high pressure filtered at 100 psi (6.9 bar). The filtrate was dried at 100° C. for 2 hours and then calcined at 400° C. for 4 hours. The XRD data were taken after air calcination and the percent strain was estimated from the Williamson-Hall method.

TABLE 2

Crystallite Strain

| Orifice Size (inches) | Strain % |
|---|---|
| 0.073 | 0.26 |
| 0.081 | 0.23 |
| 0.089 | 0.26 |
| 0.095 | 0.29 |
| 0.105 | 0.32 |
| 0.115 | 0.33 |
| 0.230 | 0.43 |

As shown in Table 2, the strain content of the crystallites increased from 0.2% prepared with a small orifice (0.073 inches diameter) to 0.35% prepared with a large orifice (0.115 inches diameter), linear with its diameter. The ability to systematically alter the strain within a crystallite is important due to the fact that it systematically changes the chemical potential of the surface atoms which is important to the application of these materials as photocatalysts and as optical absorbers.

EXAMPLE 10

The synthesis of 20% w/w Ag on titania of nanostructured metallic silver was examined as a function of orifice size, and the results were compared to the conventional synthesis of such metal supported materials. The synthesis of this material was carried out as follows:

A precipitating agent consisting of 1000 ml of deionized water was recirculated in the CaviMax™ processor equipped with a 0.075 inch diameter orifice. A 100 ml solution of titanium (IV) butoxide ($Ti[O(CH_2)_3CH_3]_4$) in isopropyl alcohol (0.63 mol/L Ti) was added to the CaviMax at 4 ml/min to form a precipitate. The total time of precipitation plus additional recirculation was 30 minutes. Immediately afterwards, two solutions were added simultaneously to the recirculating, precipitated titanium slurry. The first solution consisted of a 250 ml silver solution of silver acetate ($AgOOCCH_3$) in deionized water (0.046 mol/L Ag), which was added at a rate of 10 ml/min. The second feed was a 250 ml solution of hydrazine ($N_2H_4$) in water (0.70 mol/L $N_2H_4$), such that the $N_2H_4$/Ag molar ratio was 15.0, which was added at a rate of 10 ml/minute. The total time of addition plus additional recirculation was 30 minutes. The product was filtered, washed with water to form a wet cake, and then dried in an oven at 110° C. A portion of the dried product was calcined in air for 4 hours at 400° C. A portion of the dried product was submitted for x-ray analysis and identified as silver on an amorphous titanium support. X-ray line broadening analysis indicated that the mean silver crystallite size was 7.4 nm. A portion of the calcined product was submitted for x-ray analysis and identified as silver on titania. All of the titania was identified as anatase, while no rutile was observed. X-ray line broadening analysis indicated that the mean silver crystallite size was 12.0 nm. The conventional synthesis was performed as above except in a stirred 1500 ml beaker.

The grain sizes of the silver particles after drying the samples at 110° C. are shown in Table 3. This example shows that metallic particles deposited on reactive supports such as titania can be synthesized in smaller grain sizes as compared to parallel conventional synthesis. Furthermore, when the catalysts were calcined to 400° C. in air, the silver particles deposited on the conventional catalyst grew to a much larger size than those deposited by cavitational techniques. These types of materials are important as photocatalysts for the destruction of toxins in waste chemical streams.

TABLE 3

Grain Size of 20% w/w Silver on Titania

|  | Grain size, dried (nm) | Grain Size, Calcined 400° C. |
|---|---|---|
| Conventional Precipitation-Deposition | 7.6 | 20.1 |
| CaviMax 0.115 orifice | 4.7 | 13.4 |
| CaviMax 0.073 orifice | 7.4 | 12.0 |

EXAMPLE 11

2% w/w silver was synthesized on alpha-alumina using both a cavitational synthesis and a conventional synthesis. The synthesis of this material was carried out as follows.

A slurry consisting of 5.00 g of aluminum oxide (alpha, $Al_2O_3$) in 1000 ml deionized water was recirculated in the CaviMax processor equipped with a 0.073 inch diameter orifice. Two solutions were added to the recirculating aluminum oxide slurry. The first solution consisted of a ml solution of silver acetate ($AgOOCCH_3$) and ammonium hydroxide ($NH_4OH$) in deionized water. The concentration of the silver was 0.0095 mol/L, and the concentration of ammonium hydroxide was 0.095 mol/L, so that the $NH_4OH$/Ag molar ratio was 10.0. The silver solution was added to the aluminum oxide slurry at a rate of 4 ml/minute. The second feed was a 100 ml solution of hydrazine ($N_2H_4$) in water (0.14 mol/L $N_2H_4$), such that the $N_2H_4$/Ag molar ratio was 15.0, which was added at a rate of 4 ml/minute. The total time of addition plus additional recirculation was 30 minutes. The product was filtered, washed with water to form a wet cake, and then dried in an oven at 110° C. A portion of the dried product was submitted for X-ray analysis and identified as silver on alpha alumina. Conventional synthesis was performed in the same manner as above except in a stirred 1500 ml beaker.

The data in Table 4 show that the cavitational synthesis using an orifice size of 0.073 in. diameter and a 10/1 $NH_4OH$/Ag ratio resulted in much smaller grain sizes of Ag.

TABLE 4

Grain sizes (nm) of 2% $Ag/Al_2O_3$ synthesis

| 2% Ag/titania | 10:1 $NH_4OH$:Ag |
|---|---|
| Conventional Synthesis | 20.9 nm grains |
| CaviMax 0.073 in. dia. | 14.0 nm grains |

The present invention was utilized for the synthesis of nanostructured particles of gold supported on titanium oxide ($TiO_2$). The synthesis of this material was carried out as follows:

A precipitating agent consisting of 650 ml of deionized water was recirculated in the CaviMax™ processor equipped with a 0.075 inch diameter orifice. A 100 ml solution of titanium (IV) butoxide ($Ti[O(CH_2)_3CH_3]_4$) in isopropyl alcohol (0.88 mol/L Ti) was added to the CaviMax™ at 4 ml/minute to form a precipitate. The total time of precipitation plus additional recirculation was 37.75 minutes. Immediately after, two solutions were added simultaneously to the recirculating, precipitated titanium slurry. The first solution consisted of a 1000 ml gold solution of chloroauric acid ($HAuCl_4$ $3H_2O$) in deionized water (0.0073 mol/L Au), which was added at a rate of 4.7 ml/minute. The second feed was a 100 mm solution of hydrazine ($N_2H_4$) in water (0.12 mol/L $N_2H_4$), such that the $N_2H_4$/Au molar ratio was 16.7, which was added at a rate of 0.4 ml/minute. The total time of addition plus additional recirculation was 3.62 hours. The product was filtered, washed with water to form a wet cake, and then dried in an oven at 110° C. A portion of the dried product was calcined in air for 4 hours at 400° C. A portion of the calcined product was submitted for x-ray analysis and identified as gold on titania (anatase). X-ray line broadening analysis indicated that the mean gold crystallite size was 7.5 nm, and that the mean anatase crystallite size was 12.9 nm. Conventional synthesis was prepared in the manner above except in a stirred 1500 ml beaker.

The data in Table 5 shows that cavitational processing during the synthesis of 2% w/w of gold on titania results in systematically decreasing, grain sizes into the very small manometer size range. This example shows that the combination of orifice size selection and process parameters afford a control of grain sizes not possible with conventional synthesis.

TABLE 5

Grain size as a function gold solution volume

| Gold conc. (mol/L) | Volume of Au soln. (mL) | $H_2NNH_2$ feed rate (mL/min) | Titania grain size (nm) | Gold grain size (nm) |
|---|---|---|---|---|
| 0.0145 | 50 | 8.0 | 12.5 | 78.6 |
| 0.0073 | 100 | 4.0 | 11.6 | 33.6 |
| 0.0036 | 200 | 2.0 | 11.4 | 27.9 |
| 0.0018 | 400 | 1.0 | 12.0 | 16.0 |
| 0.0007 | 1000 | 0.4 | 12.9 | 7.5 |

Where cavitation synthesis gave a 16 nm Au grain size, conventional synthesis resulted in a grain size of 25 nm. Where cavitation synthesis gave a 7.5 nm Au grain size, conventional synthesis gave a grain size of 23 nm.

EXAMPLE 13

The present invention was used to synthesize commercially important piezoelectric solid state materials in very high phase purities at low thermal treating temperatures.

TABLE 6

Preparation of PZT in different stoichiometries

| Ratio Zr:Ti | ZrBut [ml] | TiBut [ml] | Sum formula |
|---|---|---|---|
| 30:70 | 15 | 35 | $Pb(Zr_{0.3}Ti_{0.7})O_3$ |
| 40:60 | 20 | 30 | $Pb(Zr_{0.4}Ti_{0.6})O_3$ |
| 50:50 | 25 | 25 | $Pb(Zr_{0.5}Ti_{0.5})O_3$ |
| 60:40 | 30 | 20 | $Pb(Zr_{0.6}Ti_{0.4})O_3$ |

Four solutions were prepared to synthesize PZT. 105.95 g (0.279 mol) Pb(II)acetate trihydrate (PbAc) were dissolved in 1000 ml purified water. 100 g (0.279 mol) Ti-Butoxide (TiBut, 97%) were diluted with 2-Propanol to 500 ml. 132.58 g (0.279 mol) Zr-Butoxide-Butanol-Complex (ZrBut, 80%) was diluted with 2-Propanol to 500 ml. 2.74 g (0.0285 mol) of ammonium carbonate (Amm) was solved for each run in 350 ml water to give a 0.0814M solution. The detailed stoichiometric information for this series is given in Table 6. The ammonium carbonate solution was placed in the reservoir and circulated. The Zr and Ti solutions were combined and fed at a rate of 2.5 ml/minute into the reservoir stream at a position just before the inlet to the high pressure, pump. The Pb-acetate solution was co-fed with a rate of 5 ml/minute. All of the metal containing components immediately precipitated and were drawn into the high pressure zone of the cavitation processor and then passed into the cavitation generation zone. All samples were dried over night and calcined in three steps for four hours at 400° C., 500° C. and 600° C.

XRD patterns illustrated that above a calcination temperature of 500° C. only the pure perovskite phase is formed with no lead oxide or zirconium oxide impurities. The XRD patterns contains some finer crystallites of this material appearing as a broad band centered at 30 degrees 2θ. This material disappears from the composition after calcination to 600° C.

Figure 1:
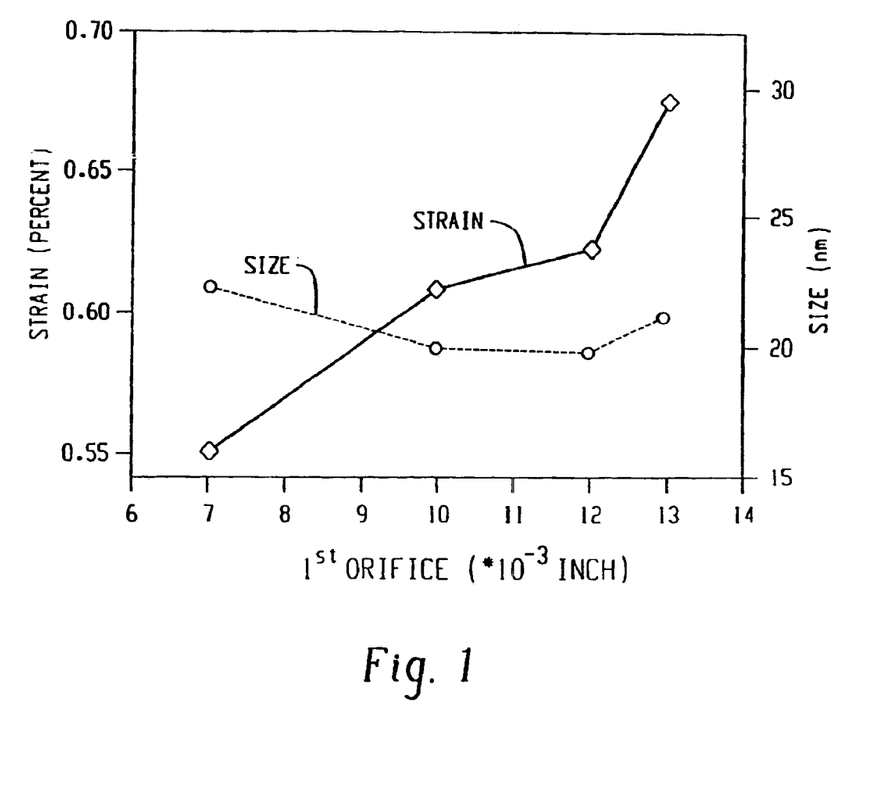
FIG. 1 shows the variation in the strain and grain size of a piezoelectric as a function of orifice size.

Furthermore, this type of material showed a much higher phase purity than the classical method of preparation in which only vigorous mechanical stirring was done during the co-precipitation step. The data in FIG. 1 illustrates that the hydrodynamic cavitation technique enables the synthesis of piezoelectries in compositions having a very high degree of strain built into the individual crystallites. Furthermore, FIG. 1 shows that the degree of strain can be systematically introduced into the crystals as a function of the type of orifice used in the synthesis. It was found that the degree of strain introduced by cavitation was much greater than that found in a classical method of piezoelectric synthesis of the same composition.

Figure 2:
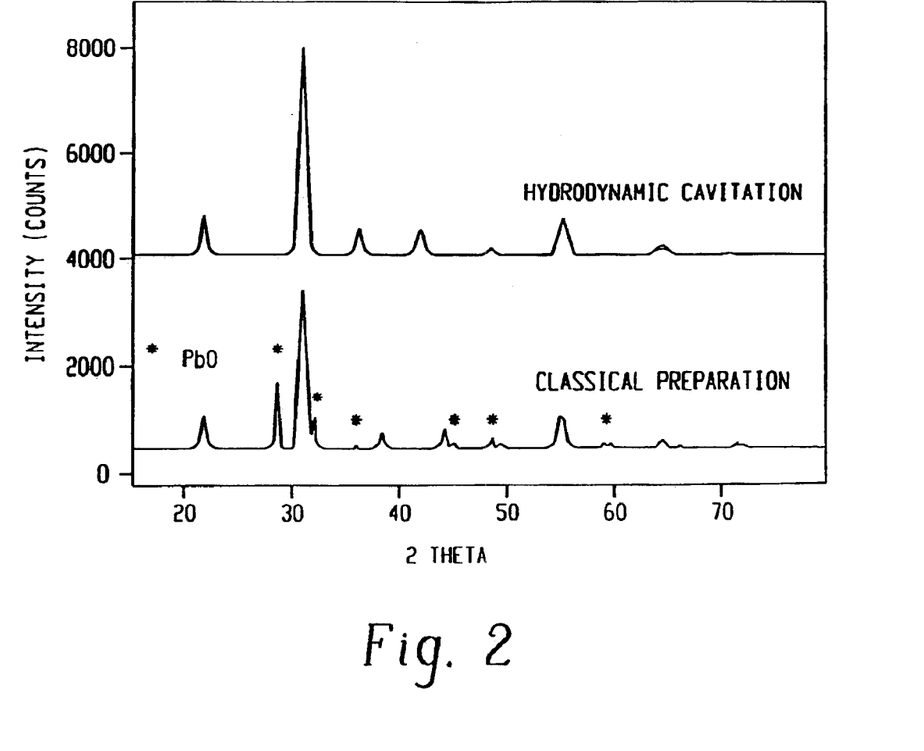
FIG. 2 is an XRD comparison of a piezoelectric prepared according to the present invention and by classical preparation.

The data in FIG. 2 illustrates the advantage of cavitational processing in PZT synthesis by a direct comparison to a classical co-precipitation synthesis. The top XRD pattern in FIG. 2 resulted from a cavitational preparation after 600° C. air calcination. The lower figure resulted from a classical co-precipitation carried out using the same synthesis procedure except that only high speed mechanical stirring was used in the co-precipitation step rather than cavitational processing. A comparison of the two XRD patterns shows that the classical pattern has a substantial fraction of separate phase lead oxide while the cavitational preparation has no secondary phase in its composition. This higher phase purity is exceptionally important to the functioning of the materials as a piezoelectric device.

EXAMPLE 14

The present invention was utilized for the synthesis of fine particles of pure metallic particles in a slurry where the grain size can be altered depending upon the orifice sizes being used. The data in Table 7 illustrates the capability to form nanostructured grains of finely divided metals typically used commercially to hydrogenate aromatics and functional groups on organic intermediates in fine chemical and pharmaceutical chemical processes. The synthesis of this material was carried out as follows:

Hexachloroplatinic acid was dissolved 0.465 g in 50 ml isopropanol. This platinum solution was fed to a stirred Erlenmeyer flask, containing 0.536 g hydrazine hydrate, 54.7% solution in 50 ml isopropanol. The platinum solution feed rate was 5 ml/minute. Directly following the platinum reduction, the solution was fed to the CaviPro processor, and processed for 20 minutes, after which time the XRD of the dried powders were measured.

TABLE 7

Effect of pressure and orifice sizes on the synthesis of nanostructured platinum

| Orifice set | Pressure | Pt metal grain size (nm) |
| --- | --- | --- |
| .004/.014 | 25,000 psi | 3.9 |
| .004/.006 | 25,000 psi | 3.7 |
| .004/.014 | 15,000 psi | 4.1 |
| .004/.006 | 15,000 psi | 3.9 |
| Classical | 14.7 psi | 5.4 |

EXAMPLE 15

The process of the present invention was used to fabricate the commercially important silver on α-alumina catalysts used in the production of ethylene oxide from the partial oxidation of ethylene. The data in Table 8 illustrates the XRD determined grain sizes of the silver particles which had been deposited onto c-alumina during the cavitational synthesis in which the silver was reduced in a cavitation experiment and then deposited onto the α-alumina in water using classical techniques. The data shows that changing the orifice sizes used in each experiment can alter the grain size of the silver. The characteristics of the different orifice sizes are expressed as the throat cavitation numbers calculated for each experiment, which is a common reference for the occurrence of cavitation in flowing fluid streams. Using this method of characterization, the cavitation generated in the metal synthesis stream is higher as the throat cavitation numbers decreases.

The synthesis of this material was carried out as follows:

2% silver on α-alumina was prepared by the reduction of silver acetate using hydrazine. This reduction was conducted in the CaviPro™ processor at a pressure of 15,000 psi, followed by a classical adsorption/deposition of an aqueous slurry of silver particles onto an alpha-alumina support. The number of passes of the medium for each consecutive experiment was fixed, and the feed flow rates and processing time were adjusted accordingly. The total number of passes for this series of experiments was held constant at 17.6. Experiments were conducted at varying throat cavitation number, by varying the size of the first orifice.

TABLE 8

Variation in silver particle grain sizes

| Orifice Sets in./in. | Throat Cavitation Number (calculated) | Silver Grain size (nm) |
| --- | --- | --- |
| 0.005/0.014 | 3.07 | 16.00 |
| 0.007/0.014 | 4.36 | 21.00 |
| 0.009/0.014 | 5.46 | 19.20 |
| 0.011/0.014 | 7.93 | 17.30 |

EXAMPLE 16

The degree of calcination was examined when using the present invention. Four separate samples of solid ammonium molybdate were calcined for four hours in air to 100° C., 175° C., 250° C. and 325° C. respectively. XRD data was then taken for each sample. A sample of ammonium molybdate was dissolved in water and fed into an isopropyl alcohol solution (the precipitation agent) just before it passed into a CaviPro™ processor using a 0.012/0.014 inch orifice set. This sample was then filtered and dried at 100° C. XRD data was then obtained for this sample. A comparison of the XRD patterns showed that the sample generated from the present invention had a degree of calcination greater than the sample calcined at 100° C., and about equal to that of the 175° C. sample. Considering the residence time of milliseconds for the present invention as compared to 4 hours for the conventional method, the use of the present invention resulted in some in situ thermal calcination.

We claim:

1. A process for the preparation of nanostructured materials in high phase purities comprising:
   a) mixing a metal containing solution with a precipitating agent to form a mixed solution that precipitates a product; and
   b) passing the mixed solution at elevated pressure into a cavitation chamber to create cavitation thereby forming a cavitated precipitated product, said cavitation chamber includes:
      i) means for creating a cavitation zone, and
      ii) means for controlling said cavitation zone by providing adjustable back pressure within said cavitation zone.

2. The process of claim 1, wherein at least some precipitation of the mixed solution occurs in step (b).

3. The process of claim 1, wherein both high shear and at least some in situ calcination of the mixed solution occur in the cavitation chamber.

4. The process of claim 1, wherein said means for creating said cavitation zone includes a first element internally situated within a flow-through channel having a flow area wherein said first element produces a local constriction of the flow area, said cavitation zone is formed immediately after said first element.

5. The process of claim 1, wherein said cavitation chamber further comprises means for creating a second cavitation zone to produce a multi-stage process.

6. The process of claim 5, wherein said means for creating said second cavitation zone includes a second element internally situated within said flow-through channel having a second flow area downstream of said first element wherein said second element produces a second local constriction of the second flow area, said second cavitation zone is formed immediately after said second element.

7. The process of claim 6, wherein said means for controlling said cavitation zone is varying the distance between the first and second element to provide adjustable back pressure within said cavitation zone.

8. The process of claim 6, wherein said means for controlling said cavitation zone is the second local constriction produced downstream of said first element thereby providing adjustable back pressure within said cavitation zone.

9. The process of claim 6, wherein said cavitation chamber further comprises means for controlling said second cavitation zone to produce a multi-stage process.

10. The process of claim 9, wherein said means for controlling said second cavitation zone includes a third element internally situated within said flow-through channel downstream of said second element to produce a third local constriction downstream of said second element thereby providing adjustable back pressure within said cavitation zone.

11. The process of claim 4, wherein said means for controlling said cavitation zone includes a second element internally situated within said flow-through channel downstream of said first element to produce a second local constriction thereby providing adjustable back pressure within said cavitation zone.

12. The process of claim 11, wherein said means for controlling said cavitation zone creates an elevated pressure zone between said cavitation zone and said second local constriction.

13. The process of claim 11, wherein said second element is a control valve.

14. A process for the preparation of nanostructured materials in high phase purities comprising:
   a) mixing a metal containing solution with a precipitating agent to form a mixed solution that precipitates a product; and
   b) passing the mixed solution at elevated pressure and at a velocity into a cavitation chamber to create cavitation thereby forming a cavitated precipitated product, said cavitation chamber includes:
      i) means for creating a cavitation zone, and
      ii) means for controlling said cavitation zone by providing back pressure within said cavitation zone.

15. The process of claim 14, wherein at least some precipitation of the mixed solution occurs in step (b).

16. The process of claim 14, wherein both high shear and at least some in situ calcination of the mixed solution occur in the cavitation chamber.

17. The process of claim 14, wherein said means for creating said cavitation zone includes a first element internally situated within a flow-through channel having a flow area wherein said first element produces a local constriction of the flow area, said cavitation zone is formed immediately after said first element.

18. The process of claim 14, wherein the velocity of the mixed solution passing into the cavitation chamber is at a velocity sufficient to create cavitation bubbles to form downstream of the first element.

19. The process of claim 17, wherein said means for controlling includes a second element internally situated within said flow-through channel downstream of said first element to produce a second local constriction thereby providing back pressure within said cavitation zone to create an elevated pressure zone between said cavitation zone and said second local constriction.

20. The process of claim 19, wherein the cavitation bubbles are formed in said cavitation zone and the cavitation bubbles collapse in the elevated pressure zone.

21. The process of claim 20, wherein the second element provides adjustable back pressure within said cavitation zone to control said elevated pressure zone.

22. The process of claim 21, wherein the second element is a control valve.

23. The process of claim 14, further comprising a second cavitation chamber situated in series with said cavitation chamber.

* * * * *